United States Patent [19]

Hedger

[11] 4,057,186

[45] Nov. 8, 1977

[54] WIRING PENS

[75] Inventor: Denyer Edward Hedger, Southampton, England

[73] Assignee: Vero Electronics Limited, Eastleigh, England

[21] Appl. No.: 734,506

[22] Filed: Oct. 21, 1976

[51] Int. Cl.² .......................................... B65H 17/34
[52] U.S. Cl. ................................................. 226/127
[58] Field of Search ............................. 226/127–130, 226/133; 401/82–84, 65, 66, 88, 85, 89

[56] References Cited

U.S. PATENT DOCUMENTS

| | | | |
|---|---|---|---|
| 1,951,545 | 3/1934 | Carson | 226/128 |
| 2,515,354 | 7/1950 | Osborne | 226/161 X |
| 2,604,064 | 7/1952 | Sefton | 226/128 |
| 2,901,585 | 8/1959 | Baccari | 226/166 X |
| 3,070,057 | 12/1962 | Dezzani | 226/127 X |

Primary Examiner—Richard A. Schacher

[57] ABSTRACT

A wiring pen including an elongate pen-shaped body. A bore extends through the body from one end of the body to a tip at the other end of the body for the passage of a wire to the tip. A slot is formed in the body so that the bore leads to one end of the slot and continues from an opposite end of the slot to the tip. A slider is slidable in and along the slot. A tongue is formed on the slider and, in a separated position of the tongue and the slider in which the tongue is spaced from the slider, providing a path between the tongue and the slider for wire to pass to the tip. The slider and the tongue are relatively movable from the spaced position towards one another to close the path and grip the wire therebetween. The slider, in its closed position, is slidable in the slot to move the gripped wire towards the tip.

12 Claims, 9 Drawing Figures

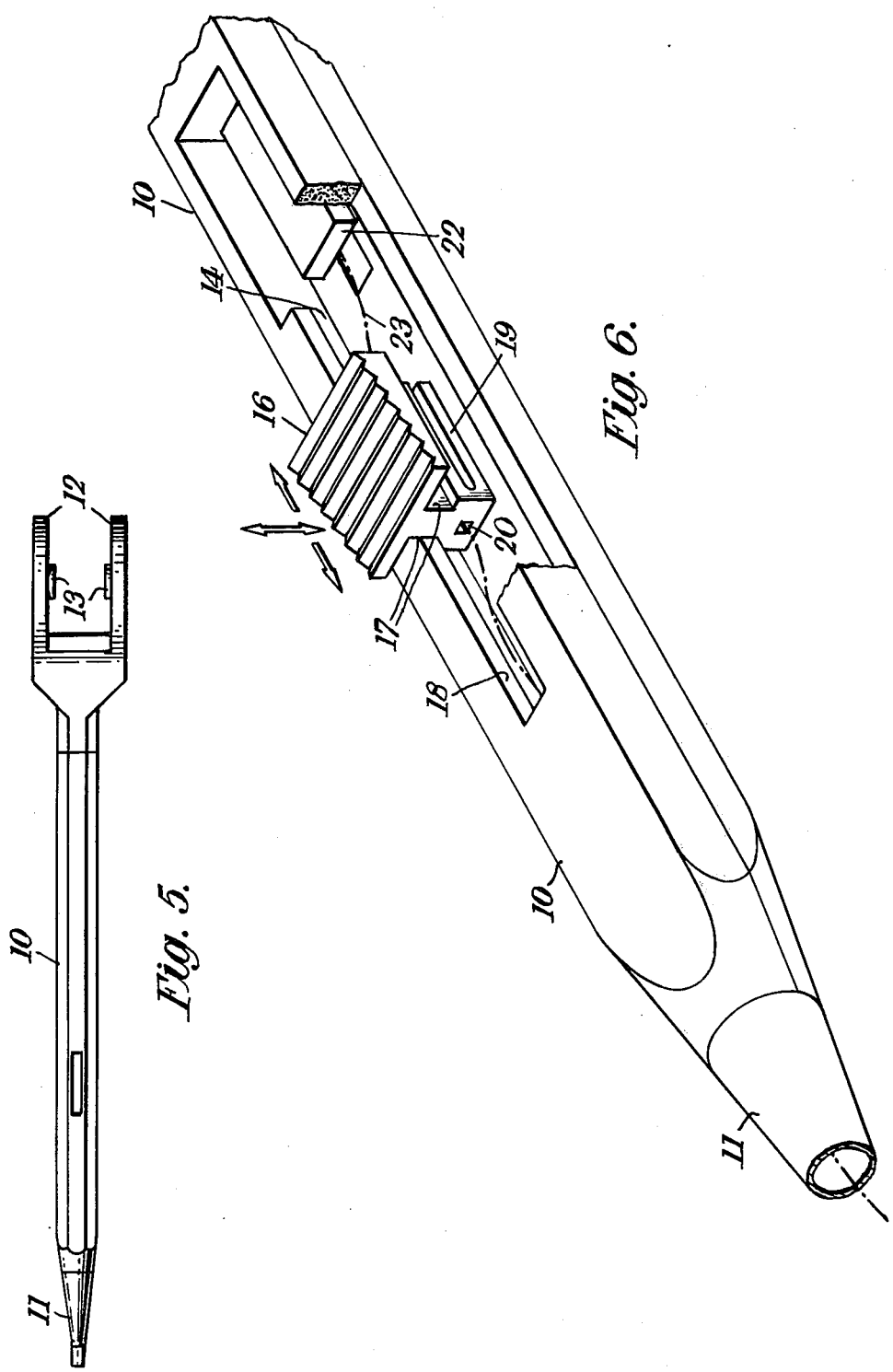

WIRING PENS

BACKGROUND OF THE INVENTION

The invention relates to tools having an elongate pen-shaped body through which, in use, an electrically conducting wire is lead from a supply. The wire is carried by the tool to a tip of the tool where the wire emerges and may be used for wiring together manually electrical components mounted on a circuit board. Such a tool is referred to hereinafter as a wiring pen.

In a previously proposed wiring pen, the wire passes through a continuous closed bore in the body from the supply to the tip. When the wire emerging from the tip of the wiring pen breaks, either deliberately or accidentally, it generally does so at the tip. It is a disadvantage of such a previously proposed wiring pen that in order to move the wire forward so that a free end emerges from the tip, the wire must be manually gripped and fed. In addition, a deliberate attempt to break the wire can be frustrated by the breaking effort pulling wire from the supply rather than breaking the wire.

SUMMARY OF THE INVENTION

It is an object of the invention to mitigate the above noted disadvantage.

According to the invention there is provided a wiring pen including an elongate pen-shaped body. A bore extends through the body from one end of the body to a tip at the other end of the body for the passage of a wire to the tip. A slot is formed in the body so that the bore leads to one end of the slot and continues from an opposite end of the slot to the tip. A slider is slidable in and along the slot. A tongue is formed on the slider and, in a separated position of the tongue and the slider in which the tongue is spaced from the slider, providing a path between the tongue and the slider for wire to pass to the tip. The slider and the tongue are relatively movable from the spaced position towards one another to close the path and grip the wire therebetween. The slider, in this closed position, is slidable in the slot to move the gripped wire forward to the tip.

BRIEF DESCRIPTION OF THE DRAWINGS

An embodiment of the invention is shown, by way of example, in the accompanying drawings in which:

FIG. 5 is a plan view from beneath of the wiring pen,

FIG. 6 is a partial perspective view, partially in section, showing a slider of the wiring pen.

DESCRIPTION OF THE PREFERRED EMBODIMENT

Figure 1:
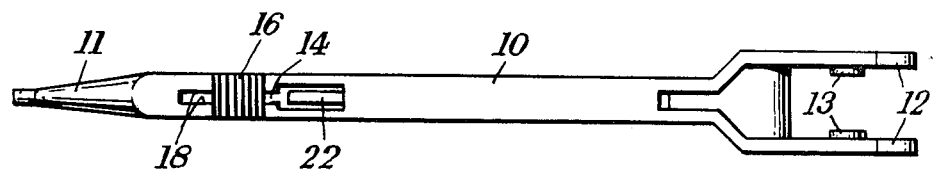
FIG. 1 is a plan view from above of a wiring pen.
Figure 2:
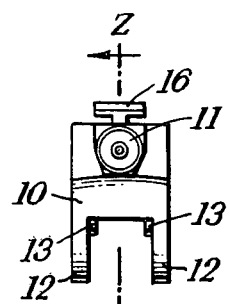
FIG. 2 is an elevational view of one end of the wiring pen of FIG. 1.
Figure 3:
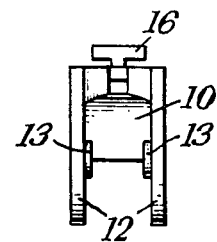
FIG. 3 is an elevational view of the other end of the wiring pen of FIG. 1.

Referring first to FIGS. 1 to 5, the wiring pen includes an elongate body 10 with a pointed tip 11 at one end and a pair of parallel ears 12 having lugs 13 for locating and holding a reel of electrically conducting wire 21 (FIG. 4) at the other end. The body 10 and ears 12 are preferably injection moulded from a plastics material.

Figure 4:
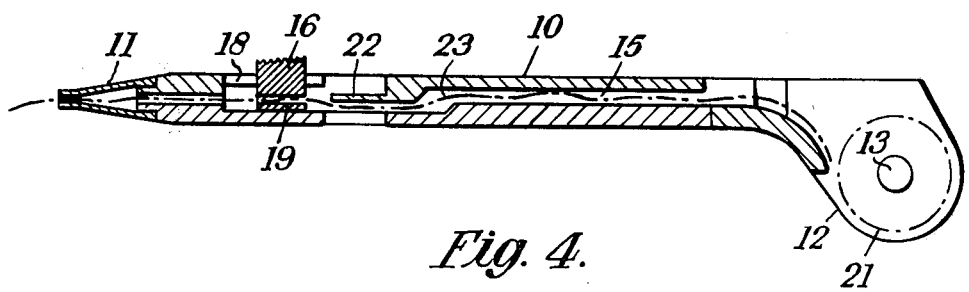
FIG. 4 is a sectional view of the line Z—Z of FIG. 2.

The body 10 is formed with a bore 15 extending therethrough and a slot 14 extending in the direction of the length of the body 10 and so arranged that the bore leads into one end of the slot and from the other end of the slot (see FIG. 4). The slot has parallel walls and a base and includes a widened portion at the end thereof remote from the tip 11 (see FIG. 4).

Figure 7A:
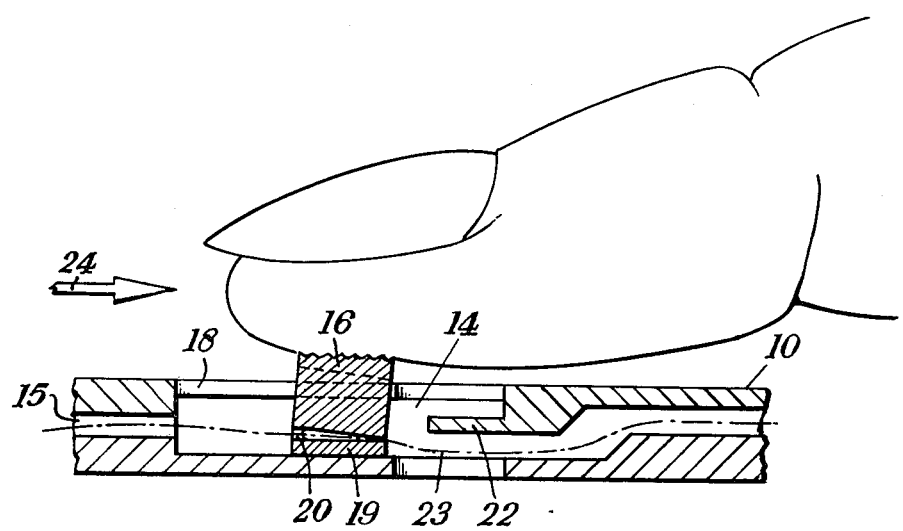
FIGS. 7a, 7b, 7c are three partial longitudinal cross-sections of the wiring pen showing together three stages in the operation of the slider.
Figure 7B:
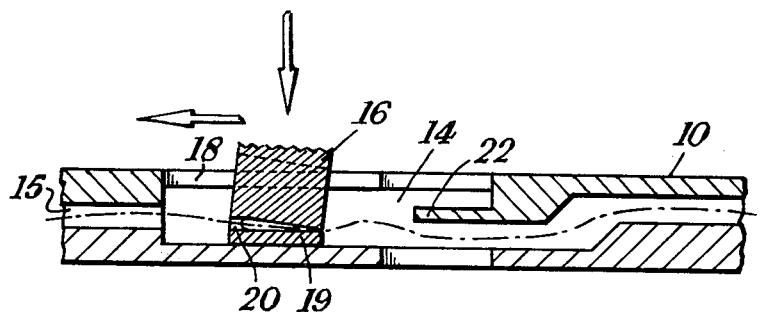
Figure 7C:
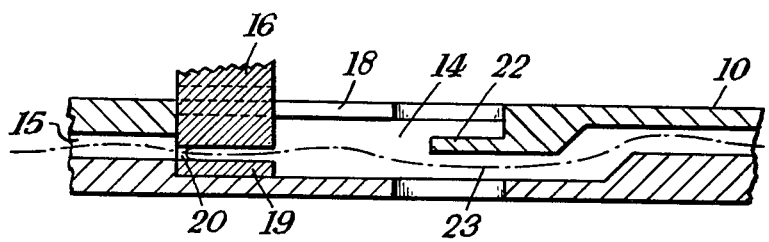

The slot 14 carries a slider 16 which is formed with two channels 17 in sliding engagement with two guides 18 formed on the body. The upper surface of the slider 16 is provided with a knurled surface which is inclined towards the tip 11 (see FIG. 6). The slider 16 is supported on a tongue 19 formed on the slider 16 and a hole 20 is provided in the connection between the tongue 19 and the slider 16. The channels 17 are so dimensioned as to allow the movement of the slider into and out of the slot 14. As best seen in FIGS. 7a, 7b, 7c, a spring strip 22 extends from the end of the slot 14 remote from the tip 11 into the widened portion of the slot end, in the position shown in the drawings prevents sliding movement of the slider 16 into the widened portion.

In use, a wire 23 from the reel of electrically conducting wire 21 is threaded through the bore 15. If the slider 16 is pushed forwards, the wire 23 can be pushed between the under-surface of the slider 16 and the upper surface of the tongue 19, through the hole 20 and through the continuation of the bore 15 to emerge at the tip 11. If, having passed the wire 23 through bore 15 to the slot 14, passage of the wire 23 through the hole 20 is found difficult, the spring strip 22 can be flexed to allow the slider 16 to be slid into the widened portion where it disengages from the guides 18 and can be removed from the slot 14. The wire 23 can then be threaded through the hole 20 and through the continuation of the bore 15 to emerge at the tip 11. The slider 16 can then be replaced in the slot 14 and pressed downwards and forwards over the spring strip 22 to re-engage with the guides 18. The tip 11 may be removable and this will make threading easier in exceptionally difficult cases.

The wire 23 is used to connect electrical components on a circuit board (not shown). When the wiring is complete, the slider 16 is drawn back by hand in the direction shown by the arrow 24 in FIG. 7a. The slider 16 is then depressed by manual pressure on the knurled surface and the under-surface of the slider 16 and the upper-surface of the tongue 19 grip the wire. The wire can then be snapped without drawing further wire from the reel.

The wire normally snaps at the tip 11. In order to provide a short length of wire at the tip 11 to commence or recommence wiring, the slider 16 is depressed by manual pressure on the knurled surface, as shown in FIG. 7b, to grip the wire between the upper surface of the tongue 19 and the under-surface of the slider 16. The slider 16 is then moved towards the tip 11 by pushing the knurled surface to draw wire from the reel and forward it so that a short length of wire emerges from the tip 11. The slider 16 is then released and the wire is no longer gripped thus allowing wire to be withdrawn from the reel during the wiring operation.

What we claim is:

1. A wiring pen for use in connecting electrical components on a circuit board with electrically conductive wire and comprising:

an elongated pen-shaped body having a bore longitudinally extending along the entire length of said body and a slot with said bore passing through said slot;

means for holding a supply of electrically conductive wire at one end of the body;

a tip at the other end of the body from which wire emerges after passing from the supply through said bore;

a slider slideably arranged within said slot;

a tongue spaced from said slider to define therebetween a path for the wire which when open allows free passage of the wire along the bore during the connection of electrical components with the wire;

a connecting member between said tongue and said slider, said connecting member tending to maintain said tongue and said slider spaced apart to define said path but permitting said tongue and said slider to be manually moved together to grip a wire passing along said path; and, said slider being slideable along said slot for moving a gripped wire along said bore towards said tip of said body.

2. A wiring pen according to claim 1 wherein said tongue supports said slider on a base of the portion of said body defining said slot and said slider is depressible towards said base of said slot to grip the wire.

3. A wiring pen according to claim 2 wherein: said slider includes a flat under-surface, said tongue includes a flat upper surface which, in said spaced position, is substantially parallel to, co-extensive with and spaced from said under surface of said slider to define said path; and depression of said slider moves said under-surface of said slider towards said upper surface of said tongue to grip a wire therebetween.

4. A wiring pen according to claim 3 wherein said connection member is at the end of said tongue and slides towards said tip of said body and a hole is provided in said connection member between said slider for the passage of a wire therethrough.

5. A wiring pen according to claim 1 wherein the portion of said body defining said slot is provided with guide means which cooperate with said slider to hold said slider in said slot and to guide said slider in sliding movement.

6. A wiring pen according to claim 5 wherein said guide means comprises a pair of parallel guides which engage in corresponding channels formed in said slider.

7. A wiring pen according to claim 5 wherein said slider and said tongue are removable from said slot for the purpose of threading wire between said tongue and said slider.

8. A wiring pen according to claim 7 wherein said slot has a widened portion at an end thereof remote from said tip of said body, said slider and said tongue are slidable into said widened portion where said slider is disengageable from said guide means thus allowing removal of said slider and said tongue from said body.

9. A wiring pen according to claim 8 wherein said body includes a spring strip which extends from the end of said slot remote from said tip into said widened portion and, in a normal position thereof, prevents sliding movement of said slider and said tongue into said widened portion, said spring strip being flexible from its normal position to allow sliding movement of said slider into said widened portion.

10. A wiring pen according to claim 1 further comprising a holder for a supply of wire, said holder being provided at said one end of said body.

11. A wiring pen according to claim 1 wherein the upper surface of said slider is provided with a knurled surface outside said slot which is inclined towards said tip and by which said slider can be slid manually and by which said gripping movement of said slider and said tongue can be performed.

12. A wiring pen according to claim 1 wherein said tip of said body is removable from the remainder of said body for the purpose of easy threading of a wire through said tip.

* * * * *